No. 655,982. F. B. MATHEWSON. Patented Aug. 14, 1900.
GARMENT FASTENER.
(Application filed May 11, 1900.)
(No Model.)
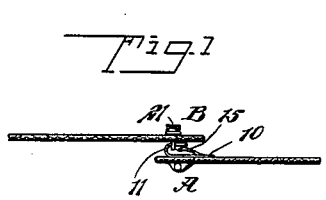
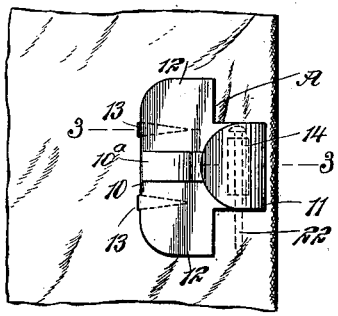
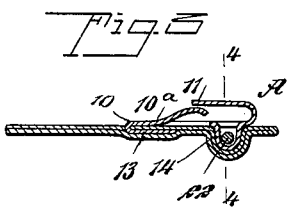
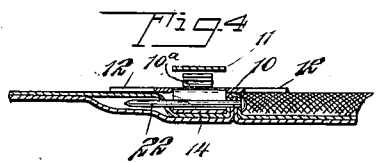
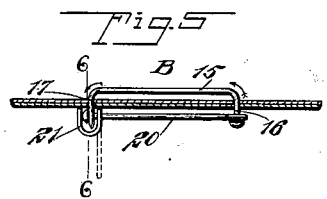
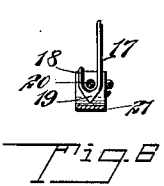
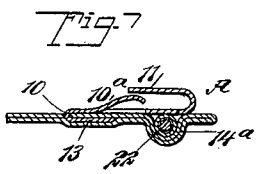
WITNESSES:
J. A. Brophy
C. R. Ferguson
INVENTOR
Fannie B. Mathewson.
BY
ATTORNEYS

UNITED STATES PATENT OFFICE.

FANNIE B. MATHEWSON, OF NEW YORK, N. Y.

GARMENT-FASTENER.

SPECIFICATION forming part of Letters Patent No. 655,982, dated August 14, 1900.

Application filed May 11, 1900. Serial No. 16,342. (No model.)

*To all whom it may concern:*

Be it known that I, FANNIE B. MATHEWSON, a citizen of the United States, and a resident of the city of New York, borough of Manhattan, in the county and State of New York, have invented a new and Improved Garment-Fastener, of which the following is a full, clear, and exact description.

This invention relates to improvements in fastening devices of the hook-and-eye order; and the object is to provide a fastener of very simple construction, comparatively cheap to manufacture, and that may be readily applied to a garment without sewing, as is necessary with ordinary hooks and eyes.

I will describe a garment-fastener embodying my invention and then point out the novel features in the appended claims.

Reference is to be had to the accompanying drawings, forming a part of this specification, in which similar characters of reference indicate corresponding parts in all the figures.

Figure 1 is a side elevation of a fastener embodying my invention. Fig. 2 is a plan view of the hook member thereof. Fig. 3 is a section on the line 3 3 of Fig. 2. Fig. 4 is a section on the line 4 4 of Fig. 3. Fig. 5 is a side view of the eye member. Fig. 6 is a section on the line 6 6 of Fig. 5, and Fig. 7 is a section showing a modification of the hook-section.

The fastener comprises a hook member A and an eye member B. The hook member comprises a metal plate 10, terminating at one end in a hook 11, and rearward of the hook are laterally-extended wing portions 12, which serve materially to prevent any lateral rocking motion of the hook. Formed at at the rear edge of the plate are fabric-engaging points or hooks 13, which are spaced slightly from the under side of the plate and extend in a forward direction, as plainly indicated in the drawings. While I have shown two of these engaging points, it is obvious that a greater or less number may be employed. Arranged on the lower side of the plate and underneath the hook portion is a receiver 14 for a pin or the like. This receiver extends at right angles to the projection of the hook, and it may be conveniently made by stamping out a portion of the plate, as clearly indicated in Figs. 3 and 4. The ends of this receiver terminate inward of the edge of the plate for a purpose to be hereinafter described. In Fig. 7 I have shown the receiver as a tube 14ª, that may be soldered or otherwise secured to the plate 10. It may be here stated that the points 13 may be integral with the plate or otherwise secured thereto, and they may be of any desired shape.

The eye member B consists of a bar 15, adapted to be engaged by the hook 11 and terminates at one end in a headed portion 16 and at the other end in a portion 17, which, like the portion 16, extends substantially at right angles to the body portion 15. The portion 17 terminates in a hook-shaped keeper 18, and the bend of this hook-shaped keeper is sharpened or pointed, as at 19, so that it may be easily forced through cloth or other material. Mounted to swing on the portion 16 is a fastening-bar 20, and the free end of this fastening-bar is designed to engage in the keeper 18, as indicated in Fig. 5. This bar 20 is mounted to swing substantially on a parallel plane with the bar or body portion 15, so that it may be moved sufficiently to one side to permit the bar or body portion 15 to be inserted through the cloth or other material.

Secured to the free end of the fastening-bar 20 is a guard-plate 21, which when the eye is placed in position is designed to be bent over the pointed portion 19, Fig. 6, of the keeper, so as to prevent any possible injury therefrom. The dotted lines in Fig. 5 indicate the position of this guard-plate 21 before bending it over the point.

To apply the hook member of the fastening device, the engaging points 13 are to be hooked into the cloth, and then a pin 22 or similar device is to be inserted in the cloth at one side of the receiver 14, then passed through the receiver, and engaged with the cloth at the opposite end. The pointed end of the pin will be on the under side of the cloth or between the body of the cloth and the lining therefor, so as to be entirely hidden from view, and the head portion will be hidden from view by the projection of the plate beyond the end of the receiver, as clearly indicated in Fig. 2. By fastening the device by means of the pin, as described, it is obvious that the engaging points will be prevented from being withdrawn from the material and also that the hook end of the plate will be held firmly in position with relation to the cloth or material.

In applying the eye portion the keeper end is first to be forced through the material from the under side and then carried over and inserted through the material from the upper side, as indicated by the arrows in Fig. 5. After this the fastening-bar 20 is to be turned and placed into engagement with the keeper 18, Fig. 6, and then the guard-plate 21 is to be turned over the pin 19, as shown in the drawings.

It is obvious that the two members of the fastening device may be quickly and readily applied to a garment and there is no danger of its being broken away by strain, as is apt to happen when hooks and eyes are sewed on in the ordinary manner, as the thread is liable to break, thus releasing the hook or eye.

For convenience the members of the fastener are shown much larger in the drawings than they will be made for actual use. In practice they will be but very little larger than the ordinary hook and eye. The size, however, will depend upon the use to which the device is to be applied. If desired, a spring-tongue 10a may be employed in connection with the hook to prevent accidental detachment. The tongue may be stamped up out of the plate.

Having thus described my invention, I claim as new and desire to secure by Letters Patent—

1. In a garment-fastener, a hook member, comprising a hook portion, an engaging point on the hook member, and a receiver for a pin or the like on said hook member, the receiver being approximately at right angles to the hook and underneath the same, substantially as specified.

2. In a garment-fastener, a hook member, comprising a hook portion, an engaging point on the hook member, and a receiver for a pin or the like on said hook member, the receiver being at approximately right angles to the hook and terminating at its ends inward of the side edges of the hook, substantially as specified.

3. In a garment-fastener, a hook member, comprising a plate having a hook portion at one end, an engaging point at the rear edge of said plate and extended forward, and a receiver for a pin or the like, consisting of a portion of the plate extended downward underneath the hook portion, substantially as specified.

4. A garment-fastener, comprising a plate having laterally-extended wings, a hook on one end of said plate, engaging points on the opposite end of said plate, and a pin-receiver in the form of an elongated eye, consisting of a portion of the plate pressed outward below the hook, substantially as specified.

5. In a garment-fastener, an eye member consisting of a bar or body portion having a keeper at one end, the bend of said keeper being sharpened at the outer edge, a fastening-bar mounted to swing on the opposite end of the body portion and to engage with the keeper, and a guard on the fastening-bar adapted to engage over said bend or sharpened portion, substantially as specified.

6. In a garment-fastener, an eye member comprising a bar or body portion, a fastening-bar mounted to swing on one end of said bar or body portion and on a horizontal plane therewith, a keeper-hook formed on the opposite end of said bar or body portion and adapted to receive the free end of the fastening-bar, the said keeper-hook being sharpened at its bend, and a guard-plate fastened to the free end of the fastening-bar and adapted to engage over said sharpened portion of the keeper, substantially as specified.

7. A garment-fastener, comprising a hook-section and an eye-section, the said hook-section consisting of a plate terminating at one end in a hook, an engaging point on the opposite end of said plate, and a receiver for a pin or the like on said plate and underneath the hook, and the eye consisting of a bar or body portion, a fastening-bar mounted to swing on the first bar or body portion, a keeper-hook on said bar or body portion and adapted to receive the free end of the fastening-bar, the bend of said keeper-hook being sharpened, and a guard-plate for said sharpened portion, substantially as specified.

8. In a garment-fastener, an eye member, consisting of a bar or body portion, a keeper on said bar or body portion, the bend of said keeper being sharpened at the outer edge, and a fastening-bar mounted to swing relatively to the body portion and to engage with the keeper, substantially as specified.

In testimony whereof I have signed my name to this specification in the presence of two subscribing witnesses.

FANNIE B. MATHEWSON.

Witnesses:
 FRANK B. CARPENTER,
 EVERARD BOLTON MARSHALL.